R. A. STRANAHAN.
SPARK PLUG.
APPLICATION FILED APR. 8, 1914.
1,180,799.
Patented Apr. 25, 1916.
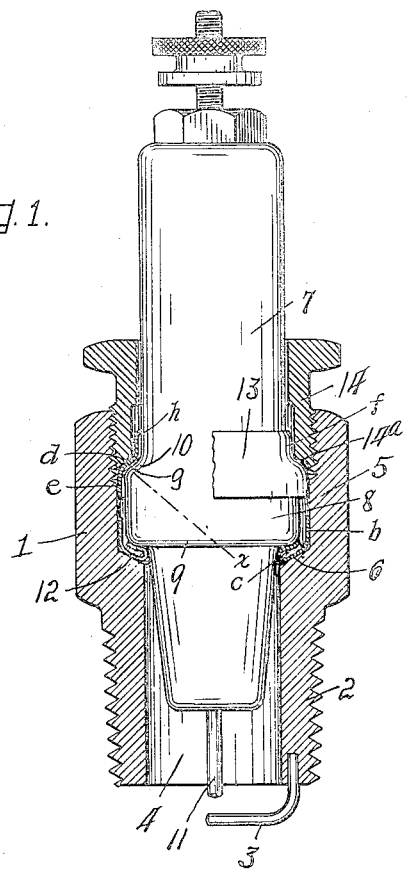
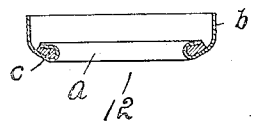
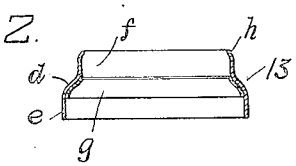
WITNESSES:-
INVENTOR.
Robert A. Stranahan,
By Owen, Owen & Crampton
His attys.

UNITED STATES PATENT OFFICE.

ROBERT A. STRANAHAN, OF TOLEDO, OHIO, ASSIGNOR TO CHAMPION SPARK PLUG COMPANY, OF TOLEDO, OHIO, A CORPORATION OF MASSACHUSETTS.

SPARK-PLUG.

1,180,799.   Specification of Letters Patent.   Patented Apr. 25, 1916.

Application filed April 8, 1914. Serial No. 830,404.

*To all whom it may concern:*

Be it known that I, ROBERT A. STRANAHAN, a citizen of the United States, and a resident of Toledo, in the county of Lucas and State of Ohio, have invented a certain new and useful Spark-Plug; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to spark-plugs, and has for its object the provision of improved means for firmly and closely holding the porcelain within the shell without injury to the porcelain and for preventing the escape of gases around the porcelain.

A further object of my invention is the provision of a gasket, particularly for use in connection with spark plugs, which gasket is provided with means for insuring a perfect centering and seating thereof relative to the shell and porcelain centered relative to the shell with the axes thereof in true parallelism.

The invention is fully described in the following specification, and while, in its broader aspect, it is capable of embodiment in numerous forms, a preferred embodiment thereof is illustrated in the accompanying drawings, in which.—

Figure 1 is an elevation of a spark-plug embodying the invention with parts in section, and Figs. 2 and 3 are sectional views of the outer and inner gaskets, respectively, of the plug.

Referring to the drawings, 1 designates the customary body shell of a spark-plug, which is provided with a threaded end portion 2 for threading into the spark-plug hole of an engine cylinder, and carries an electrode 3 at such end. The shell 1 is provided lengthwise with an opening 4, which is enlarged at its outer end, as at 5, with the bottom of such enlarged portion forming a tapered annular shoulder 6, the surface of which forms an obtuse angle to the side wall of the opening. The porcelain 7 has one end inserted into the shell opening to near the inner end thereof in spaced relation to the opening wall, and is provided intermediate its ends with an annular enlargement 8 forming the inner and outer shoulders 9 and 10, respectively. The shoulder 10 is preferably of tapered form, as shown. The porcelain carries the electrode 11, one end of which terminates adjacent to the electrode 3, as is customary in spark-plugs of this character. A gasket 12 is mounted on the shoulder 6 of the shell to receive the thrust of the porcelain shoulder 9, and a gasket 13 rests upon the porcelain shoulder 10 and receives the thrust of a follower nut 14, said gasket serving to center the porcelain in the shell.

The gasket 12 comprises a ring $a$, of sheet copper or other suitable material, which is adapted to seat on the shoulder 6, and has its outer edge turned upward to provide an upstanding flange $b$ for encircling the base portion of the porcelain enlargement 8, preferably in spaced relation thereto. The inner edge of the metal forming the ring $a$ is turned over upon the ring and coöperates with an interposed strip $c$, of asbestos or other suitable material, to form a cushion between the shoulders 6 and 9 of the porcelain and shell, respectively, as shown.

The outer gasket 13 comprises a metal part of sheet copper, or other suitable material, which is formed intermediate its ends with a tapering shoulder portion $d$, substantially conforming in contour to the porcelain shoulder 10, and from the inner edge of this portion depends a skirt portion $e$ which surrounds the outer end portion of the porcelain enlargement 8, while extending outwardly from the outer edge of the portion $d$ is a contracted portion $f$ which fits more or less closely around the porcelain without the shoulder 10. A cushion member $g$, of asbestos or other suitable material, is disposed between the shoulders 10 and $d$ of the porcelain and gasket 13, respectively. The outer edge of the portion $f$ is preferably slightly contracted, as at $h$, to coact with the porcelain to center the gasket thereon in spaced relation thereto.

The follower-nut 14 is provided at its inner end with a tapered thrust surface $14^a$, which has its thrust against the outer edge portion of the shoulder $d$ of gasket 13 and tends, upon a relative tightening of the shell and follower-nut, to force the gasket 13 and packing or cushion $g$ to a close gas tight seat on the porcelain shoulder 10. The thrust of the nut 14 against the gasket 13 and porcelain shoulder 10 is such that the strain is not applied to the porcelain shoulder in a plane parallel, or substantially parallel, to its axis but on the contrary is applied in a line which intersects such axis below the shoulder 10, as approximately indicated by the dotted line $x$, or in a conical manner. It will also be noted that the thrust of the shoulder 6 against the shoulder 9 of the gasket enlargement is also applied in a conical manner, or with the lines of stress intersecting the porcelain center. The application of the tightening or binding stresses to the porcelain enlargement 8 in this manner is found in practice to be a very important feature in spark plug construction, as it prevents the breaking-off of the porcelain enlargement so common in spark plug use, and very materially prolongs the life of the plug.

The provision on each gasket, or either of them, of a flange, which projects from an edge thereof lengthwise of the shell, is a most important feature in connection with the seating and maintaining of a gasket in true centered relation with respect to the shell and porcelain and thereby preventing a porcelain from being secured in lop-sided position within the shell or with its axis out of true parallelism with the axis of the shell, in which lop-sided position the porcelain may have contact with the metal of the shell. It is found in practice that a tighter and more perfect joint is not only provided between the seating parts of a spark-plug by maintaining a gasket in centered position therein, but also that the air space between the shell and porcelain is maintained entirely therearound so that the porcelain is not liable to be injured by having contact with the metal of the shell. It will be noted that the adjacent flanges of the gaskets 12 and 13 fit against the wall of the shell opening, thereby maintaining the gaskets in true centered relation to the shell.

While the part 7 of the plug has been generally referred to as a porcelain, it will be understood that the term porcelain as used in the specification and claims has reference broadly to the insulating member carrying the electrode 11 and not particularly to the material from which such member is made, for while these insulating members are most commonly made of porcelain, mica and other forms of insulating material have been employed.

I wish it understood that my invention is not limited to any specific construction or arrangement of the parts except in so far as such limitations are specified in the claims.

Having thus described my invention, what I claim as new, and desire to secure by Letters Patent, is,—

1. The combination with the insulating electrode carrying core and the core carrying shell of a spark plug, said core and shell having coöperating shoulders and being relatively spaced one from the other, of a gasket having an annular transversely projecting seat portion for coaction with said shoulder, and having end portions projected in opposite directions substantially lengthwise of the gasket axis from the inner and outer edges of said seat portion, with one end portion fitting the core and the other end portion fitting the shell bore.

2. In a spark plug, a porcelain having a shoulder, a shell receiving said porcelain and having a shoulder for receiving the thrust of the porcelain shoulder, said porcelain being smaller than the bore of the shell to permit a central spacing of one from the other, and a gasket disposed between the porcelain and shell shoulders and having a flange extending therefrom in spaced encircling relation to a portion of the porcelain and coacting with the wall of the shell to center the gasket within the shell.

3. The combination with the shell and porcelain of a spark plug, of a gasket having one end portion in centering contact with the shell and its other end portion in centering contact with the porcelain and having a portion intermediate said end portions which is gripped between respective portions of the shell and porcelain.

4. The combination with the shell and porcelain of a spark plug, of a gasket having a cushioning part which is gripped in opposing relation by the shell and porcelain when assembled and having a portion at one side of said cushioning part in centering contact with the shell and a portion at the other side of said cushioning part in centering contact with the porcelain.

5. The combination with the shell and porcelain of a spark plug, of a gasket comprising a metallic part and a fibrous cushioning part which jointly receive the opposing thrusts of registering portions of the shell and porcelain when assembled, the metallic part of said gasket having centering engagement with the porcelain only at one side of said fibrous part and having centering engagement with the shell only at the other side of said fibrous part.

6. The combination with the shell and porcelain of a spark plug, of a gasket having one edge portion restricted with respect to the shell and in centering engagement with the porcelain and its other edge portion enlarged relative to the porcelain and in centering engagement with the shell and having an intermediate part gripped between the shell and porcelain.

7. The combination with the shell and porcelain of a spark plug having coacting shouldered portions, of a gasket having an outwardly extending cushioned portion for interposing between said shoulders, the opposite edges of said cushioned portion having cylindrical extensions one of which is enlarged with respect to the porcelain and has centering contact with the shell and the other of which is restricted with respect to the shell and has centering contact with the porcelain.

8. In a spark-plug, a gasket having a flange projecting from one edge thereof in parallel relation to the spark plug axis to coact with an inclosing part of the spark-plug to center the gasket therein.

9. In a spark-plug, the combination with a shell, a porcelain shouldered therein, and means for securing the porcelain within the shell, of a gasket interposed between the shouldered portions of the shell and porcelain and having a flange projecting from an edge thereof, said flange fitting the bore of the shell and being loose with respect to the porcelain to center the gasket relative thereto.

In testimony whereof, I have hereunto signed my name to this specification in the presence of two subscribing witnesses.

ROBERT A. STRANAHAN.

Witnesses:
F. E. AUL,
R. G. ALLEN.